(12) United States Patent
Kreutz

(10) Patent No.: US 8,563,877 B2
(45) Date of Patent: Oct. 22, 2013

(54) FRAME

(75) Inventor: Tomas Kreutz, Lyckeby (SE)

(73) Assignee: Roxtec AB, Karlskrona (SE)

( * ) Notice: Subject to any disclaimer, the term of this patent is extended or adjusted under 35 U.S.C. 154(b) by 123 days.

(21) Appl. No.: 11/101,992

(22) Filed: Apr. 8, 2005

(65) Prior Publication Data

US 2010/0258683 A1 Oct. 14, 2010

(30) Foreign Application Priority Data

Oct. 10, 2002 (SE) ........................................ 0203044

(51) Int. Cl.
*H01R 13/502* (2006.01)
(52) U.S. Cl.
USPC .............................. 174/560; 174/559; 248/49
(58) Field of Classification Search
USPC ................ 248/346.01, 346.5, 346.03, 49, 56;
220/4.24, 4.26, 4.21; 206/723, 724,
206/701, 560, 561, 563, 564; 403/331, 293,
403/387, 388; 174/559, 560, 561, 563, 564
See application file for complete search history.

(56) References Cited

U.S. PATENT DOCUMENTS

| | | | | | |
|---|---|---|---|---|---|
| 3,617,612 | A | * | 11/1971 | Patton | 174/59 |
| 3,749,815 | A | * | 7/1973 | Boatwright et al. | 174/66 |
| 3,864,512 | A | * | 2/1975 | Meadow | 174/66 |
| 4,303,296 | A | * | 12/1981 | Spaulding | 439/189 |
| 4,449,015 | A | * | 5/1984 | Hotchkiss et al. | 174/138 F |
| 4,671,407 | A | * | 6/1987 | Brutosky | 206/718 |
| 4,691,974 | A | * | 9/1987 | Pinkerton et al. | 439/147 |
| 4,818,822 | A | * | 4/1989 | Yahraus | 174/53 |
| 5,474,178 | A | * | 12/1995 | DiViesti et al. | 206/723 |
| 5,747,734 | A | * | 5/1998 | Kozlowski et al. | 174/50 |
| 6,450,458 | B1 | * | 9/2002 | Bernard | 248/68.1 |
| 6,523,791 | B2 | * | 2/2003 | Bernard et al. | 248/68.1 |
| 6,609,684 | B2 | * | 8/2003 | Van Scoy et al. | 248/49 |
| 6,748,458 | B2 | * | 6/2004 | Andrewartha et al. | 710/2 |
| 6,934,456 | B2 | * | 8/2005 | Ferris et al. | 385/134 |
| 7,112,744 | B1 | * | 9/2006 | DeCosta | 174/66 |
| 2003/0089515 | A1 | * | 5/2003 | Federspiel et al. | 174/48 |

* cited by examiner

*Primary Examiner* — Alfred J Wujciak
(74) *Attorney, Agent, or Firm* — Harness, Dickey & Pierce, P.L.C.

(57) ABSTRACT

A frame of modular form for cable entries, pipe penetrations or the like is disclosed. The frame comprises at least two identical end modules. Depending on the desired dimensions, one or more intermediate module is placed between the end modules. The modules form at least one opening to receive the cable entries, pipe penetrations or the like. The frame may cover the openings of the frame before the cables, pipes or the like are received.

14 Claims, 6 Drawing Sheets

FRAME

TECHNICAL FIELD

The present invention concerns a frame of modular form for cable entries, pipe penetrations or the like.

PRIOR ART

Different frames of this kind are widely used today. The frames are parts of systems, used to seal at cable entries, pipe penetrations etc. In addition to the frame the systems comprise further elements or units to be placed tightly surrounding the cables, compression units etc. Systems of this kind are used in many different environments, such as for cabinets, technical shelters, junction boxes and machines. They are used in different industrial environments, such as automotive, telecom, power generation and distribution, as well as marine and offshore.

Systems of this kind or rather the frames to receive different parts are often pre-mounted in different parts, such as building components, walls, roofs etc., containers or the like. Further parts of the systems together with the cables, pipes or the like are normally mounted once the building parts or containers are in their final locations. Containers are often used to hold different kinds of specialised equipment, which containers may be relatively flexible and are transported in an assembled state to a final destination.

The systems may have to seal against fluid, gas, fire, rodents, termites, dust, moisture etc., and may receive cables for electricity, communication, computers etc. or pipes for different gases or liquids such as water, compressed air, hydraulic fluid and cooking gas.

SUMMARY OF THE INVENTION

A general object of the present invention is that the costs of the frame should be kept as low as possible without it jeopardising the function. It is costs both in manufacture and in handling that should be kept low. To simplify handling the different frame parts should be easy to assemble both to each other and to constructions where they are to be placed. A further means to simplify handling is to reduce the number of parts needed to form frames of different sizes. This means that there will be a reduced demand on parts for manufacture and storage.

As the frames often are pre-mounted it is beneficial if the frame include some kind of transport protection, covering the openings of the frame to receive the cables, pipes or the like. By covering the openings dust, fluid, moisture etc. is hindered from entering a container or the like during transport or before the actual mounting of cables, pipes or the like.

The frames are normally to be used in many different locations and for many different cables, pipes or the like, and, thus, there is a need for a frame that in a relatively simple way can be adapted to the needs of each specific case.

According to the invention a frame for cable entries, pipe penetrations or the like is formed. The frame comprises at least two end modules forming at least one opening to receive the cable entries, pipe penetrations or the like. Furthermore, it has means to cover the openings of the frame before receiving the cables, pipes or the like.

Furthermore the frame of the present invention is furnished with a flange to facilitate mounting.

The transport protection may also be used to make the frame adaptable to future use. Thus, it is possible to mount a frame having a number of positions occupied by the transport protections and which are removed only if further cables, pipes or the like are to be received. Still a further object is that the frame should be relatively easy to adapt to different uses, possibly with retrofit.

The systems using frames of the present invention are developed to involve some kind of compression unit. In use the compression units will exert pressure outwardly on the frame. Thus, the frame must be able to withstand pressures formed when the compression unit or units is in use.

In order to have low weight the frame is preferably made of a plastic material.

Other objects and advantages of the present invention will be obvious for a person skilled in the art from reading the detailed description below of preferred embodiments.

BRIEF DESCRIPTION OF THE DRAWINGS

The invention will be described more closely below by way of an example and with reference to the enclosed drawings. In the drawings.

DETAILED DESCRIPTION OF PREFERRED EMBODIMENTS

Figure 1:
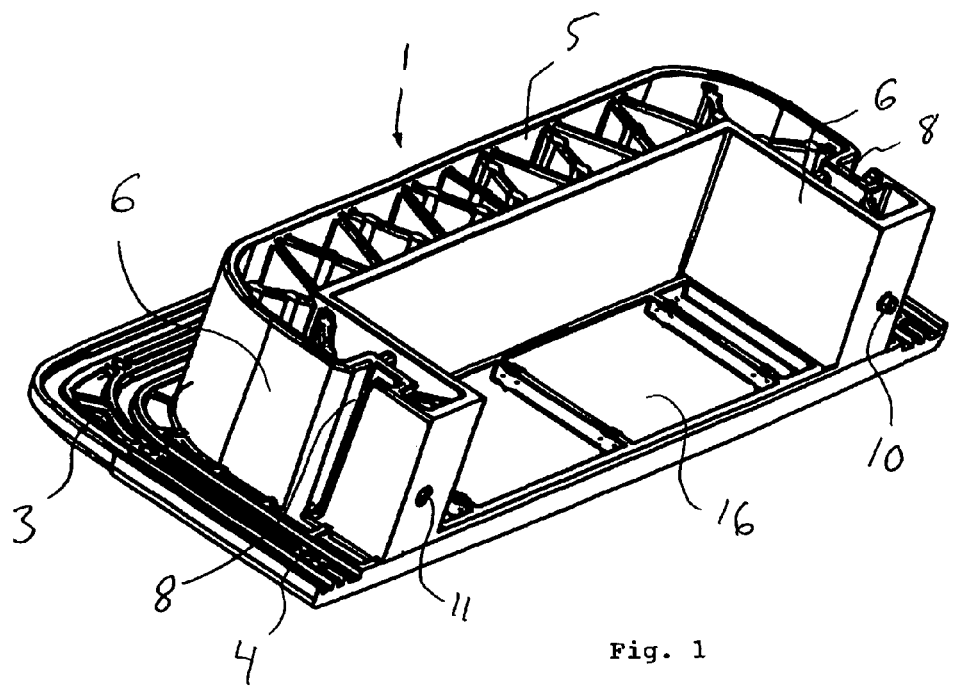
FIG. 1 is a perspective view of an end part of a modular frame according to the present invention.

When the expressions "vertical", "horizontal", "outer", "inner" and other similar expressions are used in the description below, they refer to the directions as shown in the enclosed figures. A person skilled in the art realises that in use the frames may have any orientation, the orientation being directed by the actual use.

An example of an end part or module 1 and an intermediate part or module 2 used to form a frame receiving separate units for cable entries, pipe penetrations or the like is shown in the enclosed figures. The frame normally also receives one or more compression units. To form the frame at least two end modules 1 are needed. Depending on the desired width of the frame one or more intermediate modules 2 may be placed between the end modules 1. As indicated above, no intermediate module 2 is needed if the size of two assembled end modules 1 suffice. A person skilled in the art realises that the design of the modules may vary.

In this description the expression "height" refers to the distance between the inner parts of the side rails 6, 9 of each respective frame module 1, 2. The height is referred to as h in FIG. 4. The expression "width" according to the present invention refers to the distance between the inner parts of the end rails 5 of an assembled frame. The width is referred to as w in FIG. 4.

The end module 1 has a rail formed of one end rail 5 and two side rails 6. On the outside of said rails 5, 6 a flange 3 is formed. In the flange 3 a number of holes 4 are formed. Said holes 4 are to receive fastening means for fixing the frame to a wall, floor, roof, top, bottom or the like of a house, ship, cabinet, container or the like. In other embodiments the flange 3 has no pre-formed holes. In stead holes are made depending on the actual needs in each specific case or the frame is mounted by means of an adhesive or the like. Depending on the actual placing of the frame different types of fastening means may be used, as understood by a person skilled in the art. As the fastening means as such is of no importance for the present invention it will not be discussed further here.

In each side rail 6 a groove 8 is arranged, which is to be used when the frame is assembled, as discussed further below. On the free ends of the side rails 6 a peg 10 and an opening 11 are arranged. The peg 10 is arranged on one of the side rails 6, while the opening is arranged on the other side rail 6. The peg 10 and the opening 11 are to co-operate with corresponding pegs 10 and openings 11 on adjacent parts when the frame is assembled. Said pegs 10 and openings 11 assist in keeping the different parts in a desired, correct position.

Inside the rail 5, 6 the frame has a centre part 16. The centre part 16 has the function of transport protection if the frame is pre-mounted in a building part, container etc. Said centre part 16 is to be removed just before cables, pipes or the like are to be received.

Inside the rails 5, 6 of the frame sealing and compression units are to be received as is known by persons skilled in the art. These units are to seal against the cables, pipes or the like received in the frame. As the exact form and function of these units form no part of the present invention they will not be discussed further here.

Figure 7:
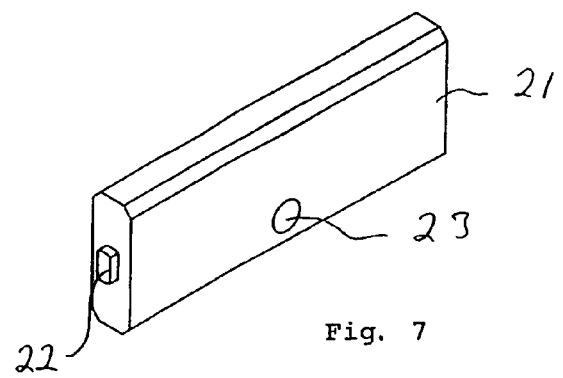
FIG. 7 is a perspective view of a compression plate that might be used in a frame according to the present invention.
Figure 8:
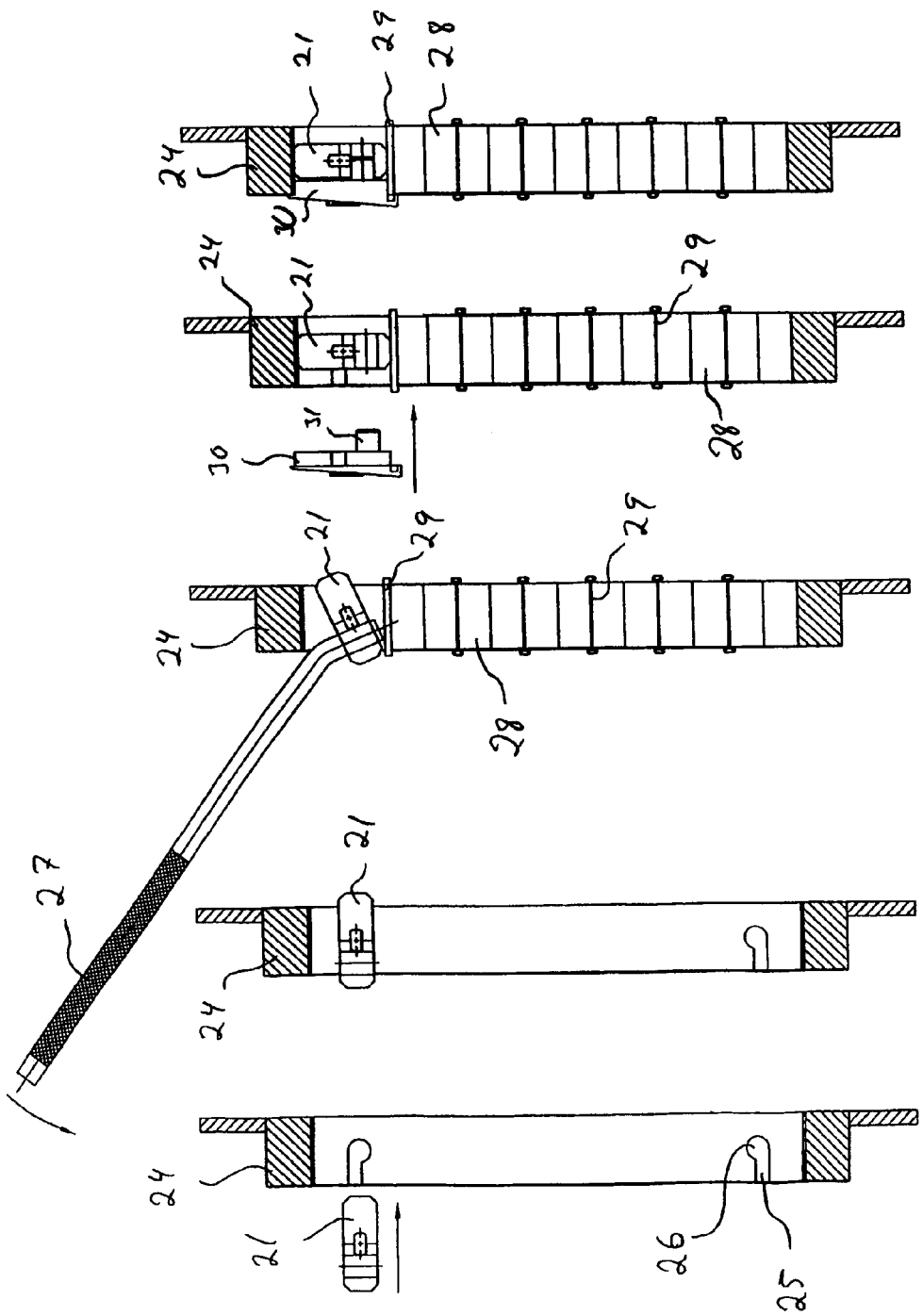
FIG. 8 is a schematic view illustrating mounting of the compression plate of FIG. 7.

However, an example of a compression unit is shown by way of an example in FIGS. 7 and 8. Said compression unit is made in a simple way to keep the costs and number of parts at a minimum, as this is an essential part of the present invention. A person skilled in the art realises that other types of compression units may be used together with the frame of the present invention. The compression unit of the embodiment of FIGS. 7 and 8 are based on a compression plate 21 placed under tension between the frame 24 and the separate units 28 in the form of cable entries, pipe penetrations etc. in use. The compression plate 21 has protrusions 22 at the ends to be received in grooves 25, 26 of the frame 24. The grooves have a introduction part 25 and a rounded part 26, to enable the compression plate 21 to be turned once it is in place in the frame 24. The compression plate 21 is turned by means of a tool 27 inserted in an opening 23 of the compression plate 21. In FIG. 8 the steps of mounting the compression plate are schematically shown. When the compression plate 21 is mounted it will compress the separate units 28 in that the plate 21 presses on a partition 29. Partitions 29 are also inserted between the separate units 28. A cover 30 is often placed on the compression plate 21 after mounting, whereby a knurl 31 of the cover 30 is received in the opening 23 of the compression plate 21. A person skilled in the art realises that at least one compression unit is received in each opening of the frame surrounded by end, side and/or intermediate rails 5, 6, 9, 12. Thus, the numbers of openings and compression units are decided by the number of modules 1, 2 used.

Figure 2:
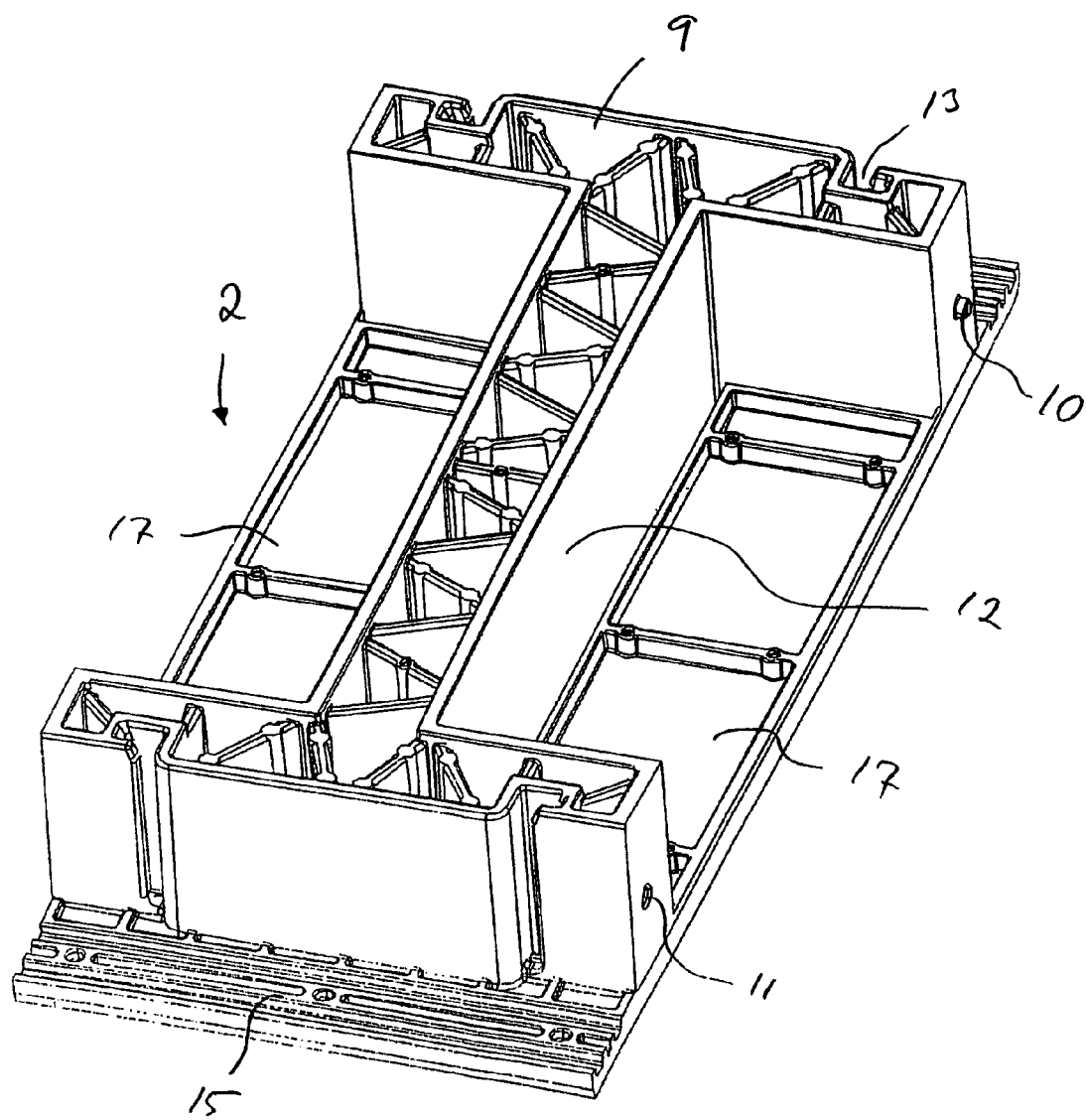
FIG. 2 is a perspective view of an intermediate part of a modular frame according to the present invention.

In FIG. 2 an example of an intermediate module 2 is shown. One or more intermediate modules 2 are to be mounted between two end modules 1 to form a frame having two or more openings.

The intermediate module 2 has two side rails 9. The position for these side rails 9 are to match the position of the side rails 6 of the end modules 1 and also side rails 9 of any further intermediate modules 2. Between and perpendicular to the side rails 9 an intermediate rail 12 is furnished. Outside the side rails 9 the intermediate module 2 has a flange 15. Also the flange 15 of the intermediate module 2 is furnished with holes 4 to receive suitable fastening means. A person skilled in the art realises that the number and positions of the holes 4 may vary. In other embodiments there may be no holes at manufacture. Any holes needed is then formed at mounting of the frame or the frame may be attached in a way not requiring any holes.

Also the intermediate module 2 is furnished with a centre part 17 between the side rails 9, functioning as a possible transport protection. Said centre part 17 is to be removed when one or more cables, pipes or the like are to be received. To facilitate the removal of the centre part 17, indications of rupture are normally formed. This also applies for the centre part 16 of the end module 1.

In each side rail 9 a groove 13 is arranged, which is to be used when the frame is assembled, as discussed further below. On the free ends of the side rails 9 a peg 10 and an opening 11 are arranged. The peg 10 is arranged on one of the side rails 9, while the opening 11 is arranged on the other side rail 9. The peg 10 and the opening 11 are to co-operate with corresponding pegs 10 and openings 11 on adjacent parts when the frame is assembled. Said pegs 10 and openings 11 assist in keeping the different parts in a desired, correct position.

Figure 5:
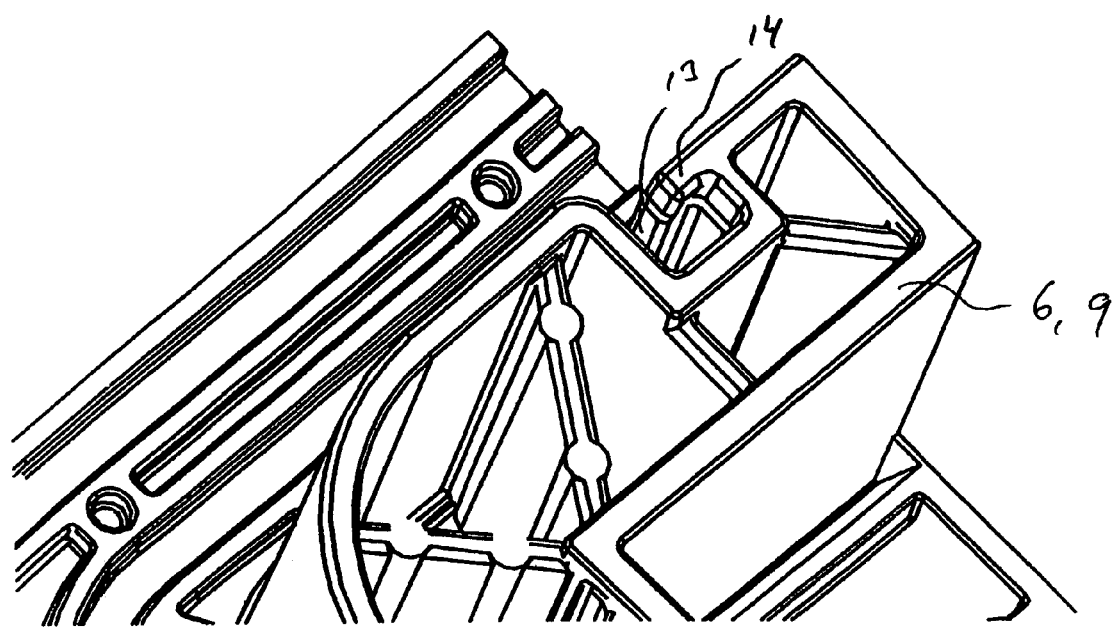
FIG. 5 is an enlarged view of a part of a module according to the present invention.
Figure 6:
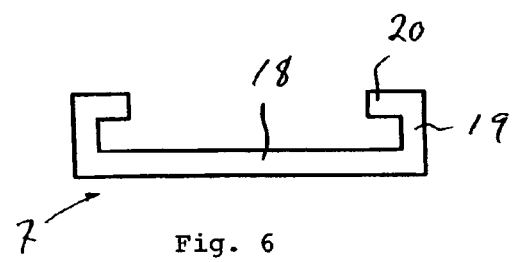
FIG. 6 is a plan view of a locking clamp used in the present invention.

In use the frame is normally first assembled by the appropriate number of end and intermediate modules 1, 2. To assemble the frame at least two end modules 1 and possible intermediate module(s) are locked to each other by means of locking clamps 7. The locking clamps 7 are received in the grooves 8, 13 of the side rails 6, 9 of adjacent modules 1, 2. The form of the locking clamps 7 and the grooves 8, 13 are adapted to each other. In the shown embodiment the grooves 8, 13 of the side rails 6, 9 has a lip 14 extending along one side of the groove 8, 13 and covering a part of the opening of the groove 8, 13, as shown in FIG. 5. The locking clamp 7 has a corresponding design with a base part 18, two side parts 19 at the ends of and at right angles to the base part 18 and two lips 19 at the ends of and at right angles to the side parts 19. The base part 18 and the lips 20 of the locking clamp 7 are parallel in the shown embodiment. The lips 20 of the locking clamp 7 are to grip behind the lips 14 of the grooves 8, 13. When assembling the frame also the pegs 10 and openings 11 of the adjacent modules 1, 2 assist in locking the modules 1, 2 to each other. Thus, the modules 1, 2 will be firmly locked to each other. A person skilled in the art realises that the exact form of the grooves and the locking clamps may vary as long as they are adapted to each other and give a secure and firm locking of the frame modules 1, 2. By the co-operation between the locking clamp 7 and grooves 8, 13, any mutual movement in the directions of the height h and width w, respectively, of the formed frame are counteracted.

Figure 9:
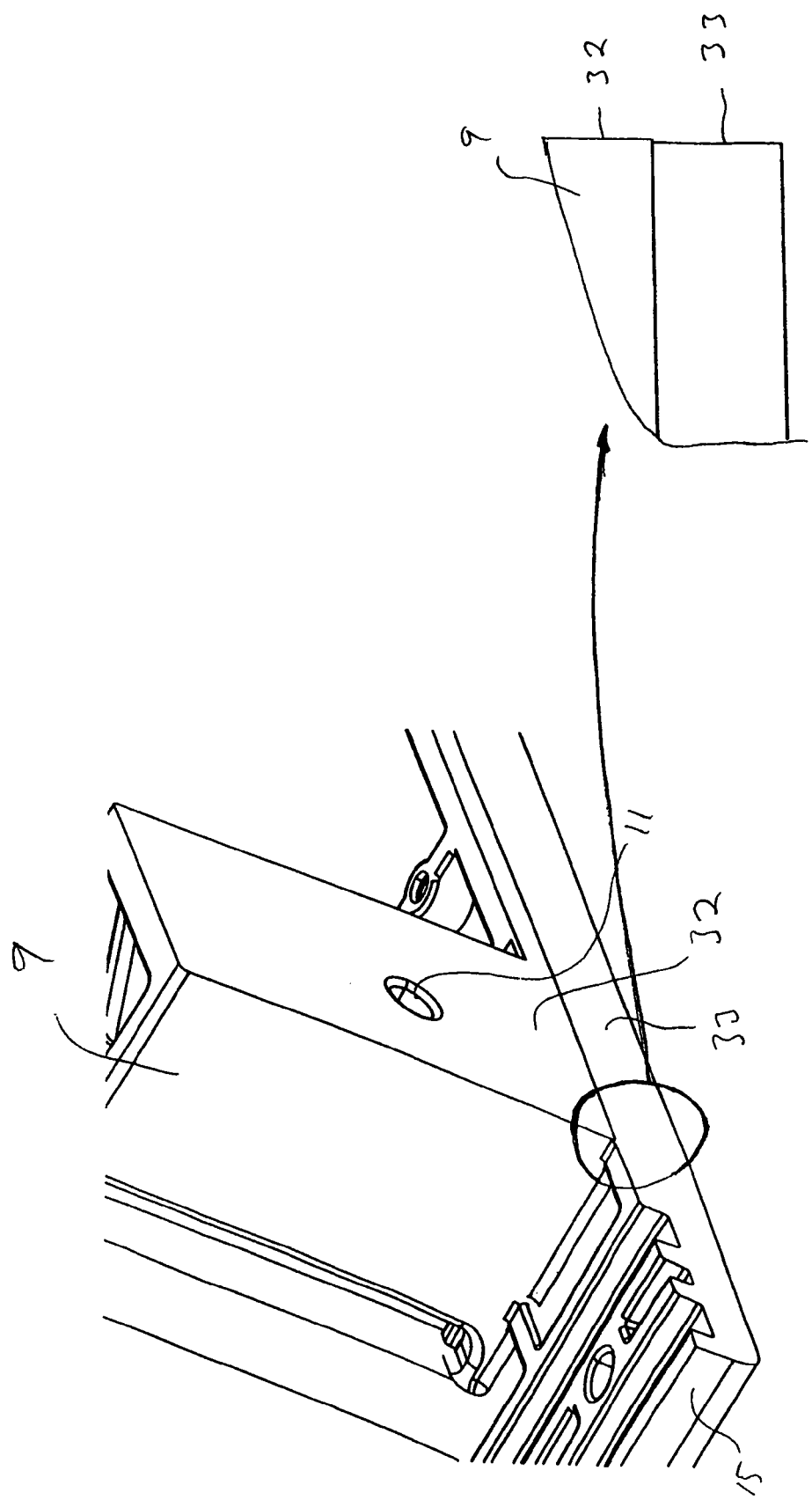
FIG. 9 is an enlarged view of a part of an module according to the present invention.

Normally a sealing, in form of a sealing tape, a O-ring, packing, gasket etc., is placed between the module parts that abut each other after assembly. To accommodate the sealing part at least one of the surfaces of the modules that are in contact with each other has a recess or the like. One example of how the sealing part is received is indicated in FIG. 9. In the example of FIG. 9 one side rail 9 of an intermediate module 2 is shown enlarged. The side rail 9 has an end surface 32 for contact with an adjacent module and also the part of the module under the side rail 9 has an end surface 33 for contact with an adjacent module. As indicated in the enlarged portion the lower end surface 33 is placed somewhat inwardly of the end surface 32 of the side rail 9. As the co-operating surfaces of the adjacent module are aligned there will be a small space formed under the side rails 9 when the frame is assembled. In said space a sealing tape or the like is to be received. The size of the space is adapted to the sealing element in such a way that the sealing element is under suitable pressure after assembly.

When the frame has been assembled it is fixed to a wall, top, bottom, floor, roof etc. of a cabinet, house, ship or the like. The outer rail formed of the side rails 6, 9 and end rails 5 will normally be placed adjacent the sides of an appropriate opening formed in the wall etc. The frame is fixed to the wall etc. by means of suitable fastening means with or without using the holes 4 of the flange 3. Normally the centre parts 16, 17 are kept in place for as long time as possible as protection. This may be of an advantage if a cabinet or the like is to be shipped to a final location.

Before the cable, pipe or the like is to be received, together with possible further sealing and compression units the appropriate centre parts 16, 17 are removed. Normally, the centre parts 16, 17 are possible to remove by a relatively gentle push or knock. As indicated above the centre parts 16, 17 may have indications of fracture along the rails, to facilitate that the centre parts 16, 17 are totally removed. However, in some instances where the protection is critical, the centre parts 16, 17 are more firmly attached to the modules 1, 2. In this latter case the centre parts 16, 17 are to be removed by using some kind of cutting tool.

Figure 3:
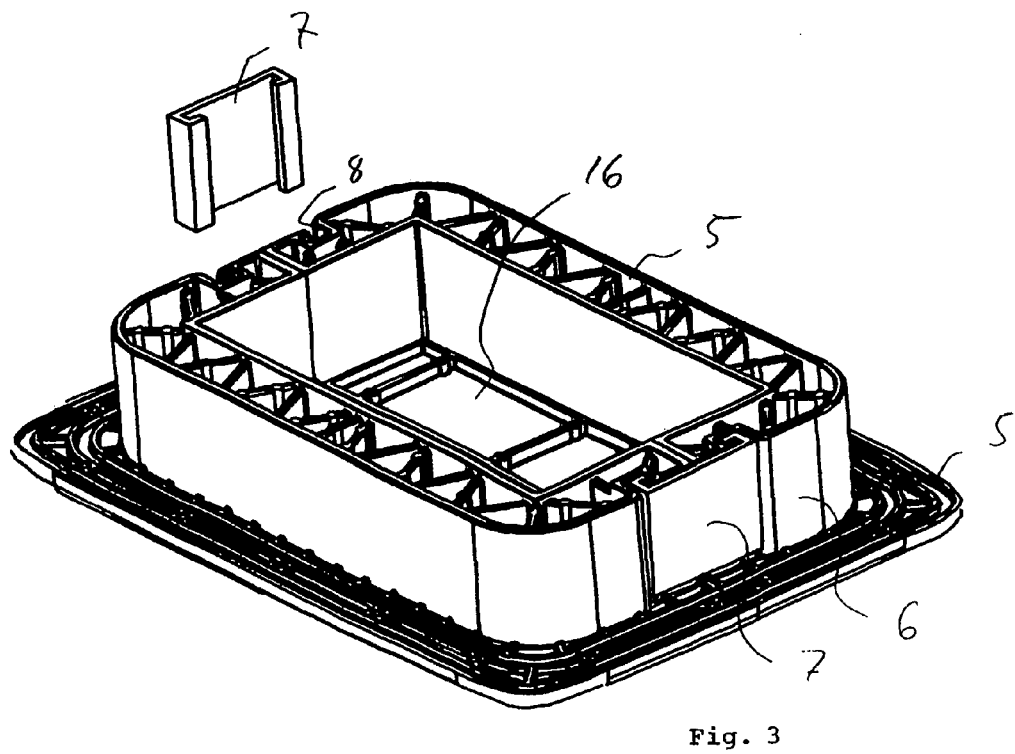
FIG. 3 is a perspective view of a frame formed by two end modules, illustrating the principle for joining the modules.
Figure 4:
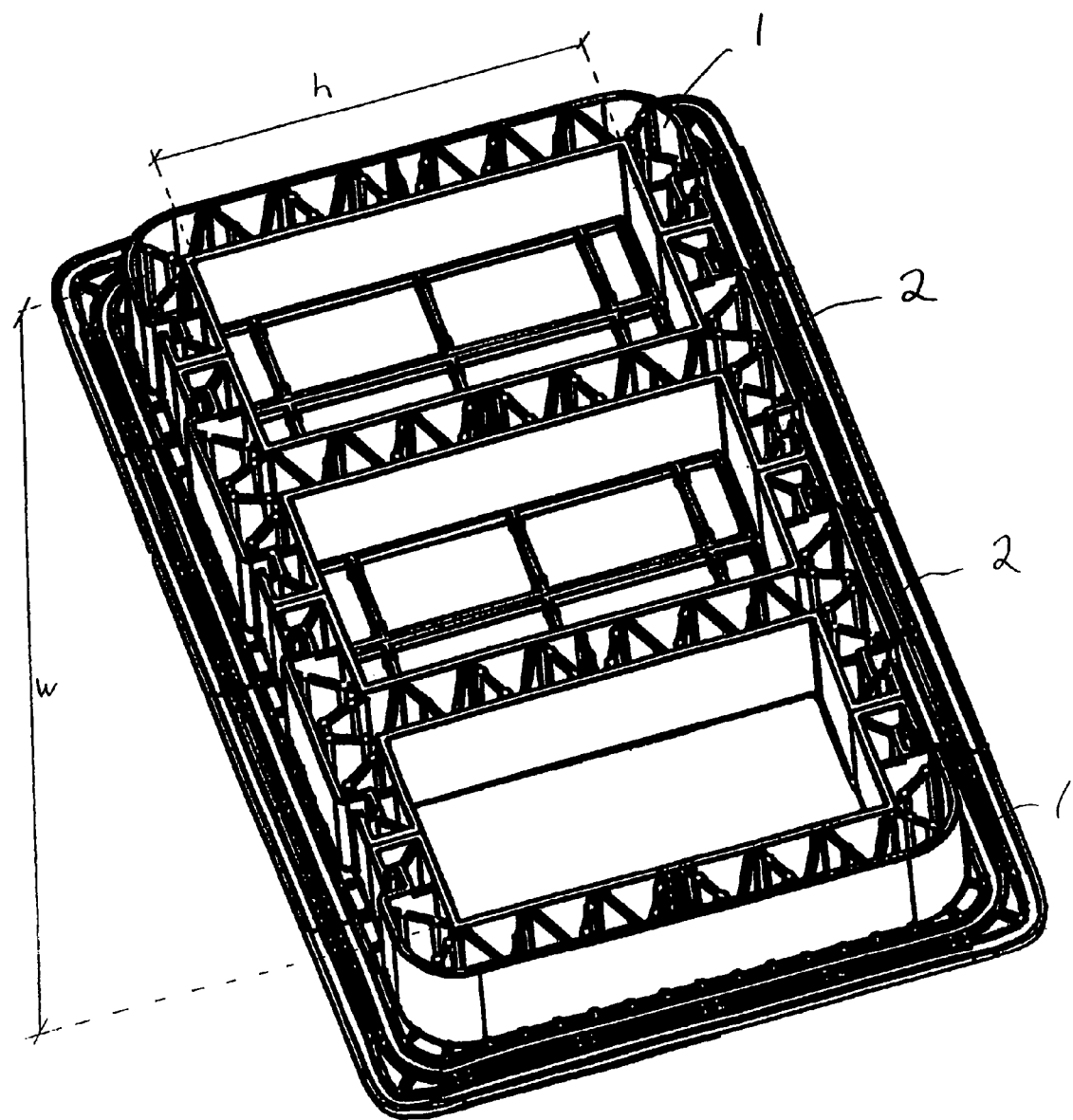
FIG. 4 is a perspective view of a frame formed of end modules and intermediate modules of FIGS. 1 and 2, respectively.

In FIG. 4, by way of an example, a frame is shown assembled of two end modules 1 and two intermediate modules 2. In the lower part of the frame, as shown in FIG. 3 the centre parts are removed from the end module 1 and the intermediate module 2, respectively. Thus, said frame part may now receive pipes, cables or the like together with sealing units. Normally also a compression unit is received in order to seal against the pipe, cable or the like.

A person skilled in the art realises that the different frame modules may be varied in many different ways. The frame modules 1, 2 could be formed without flanges 3, 15 and/or without centre parts 16, 17. Furthermore, the frames as assembled and thus, also the separate frame modules, may have other forms and dimensions than those indicated by the shown figures. The frames may have more round forms and they may have other ratios between height and width.

Normally the frame modules 1, 2 are formed by a plastic material but a person skilled in the art realises that the frame parts may be manufactured of any suitable material including metallic material.

The invention claimed is:

1. A frame for cable entries/pipe penetrations, the frame comprising:
two end modules and at least one intermediate module between the end modules assembled to form at least two through openings, enclosed by the two end modules and the at least one intermediate module, that receive the cable entries/pipe penetrations, wherein the end and intermediate modules have a centre part blocking the at least two through openings of the frame before any cables/pipes are received, wherein each end module has one end rail and two first side rails, wherein the at least one intermediate module has two second side rails and at least one intermediate rail, wherein the end rails and first side rails of the end modules and the second side rails and at least one intermediate rail of the at least one intermediate module form the at least two through openings, and wherein the positions of the first side rails of the end modules are contiguous with the second side rails of the at least one intermediate module forming a common side rail when the end and intermediate modules are assembled to each other, wherein the at least one intermediate module has an essentially I-shape formed by the intermediate rail and the two second side rails extending perpendicularly from each end of the intermediate rail.

2. The frame of claim 1, wherein the frame is configured to receive at least one compression unit in each through opening.

3. The frame of claim 1, wherein the first side rails and the second side rails of the end and intermediate modules form rectangular openings when the end and intermediate modules are assembled to form the frame.

4. The frame of claim 1, wherein the end and intermediate modules include a flange outside the first and second side rails and the end rails, which flange is configured to receive a fastener to fix the frame to a mounting surface.

5. The frame of claim 1, wherein the first and second side rails are furnished with grooves that receive a locking clamp, which locking clamp is received in grooves of side rails of adjacent end and intermediate modules.

6. The frame of claim 5, wherein the locking clamp is received in the grooves of the first and second side rails of the adjacent end and intermediate modules.

7. The frame of claim 1, wherein free ends of the first and second side rails include alternating pegs and openings for co-operation with pegs and openings of adjacent frame modules, assisting in locking the end and intermediate modules to each other in a pre-determined position.

8. The frame of claim 1, wherein the center part of each end and intermediate module is a removable center part forming covers of the openings.

9. The frame of claim 8, wherein the removable center parts have indications of rupture adjacent the rails that facilitate removal of the center parts.

10. The frame of claim 1, wherein the end and intermediate modules are made of a plastic material.

11. The frame of claim 10, wherein the end and intermediate modules are formed to receive a seal between adjoining walls of adjacent end and intermediate modules when the frame is assembled.

12. The frame of claim 1, wherein the at least two end modules each have an essentially U-shape.

13. The frame of claim 1, wherein the at least two end modules form outer most end portions of the frame.

14. The frame of claim 1, wherein side walls of the at least two end module and side walls of the at least one intermediate module abut one another.

\* \* \* \* \*